(12) United States Patent
Schwager et al.

(10) Patent No.: US 10,670,706 B2
(45) Date of Patent: Jun. 2, 2020

(54) DETECTION DEVICE, SYSTEM AND METHOD FOR DETECTING THE PRESENCE OF A LIVING BEING

(71) Applicant: Sony Corporation, Tokyo (JP)

(72) Inventors: Andreas Schwager, Waiblingen (DE); Honghui Yan, Stuttgart (DE); Norihito Mihota, Stuttgart (DE); Ralf Boehnke, Esslingen (DE)

(73) Assignee: SONY CORPORATION, Tokyo (JP)

( * ) Notice: Subject to any disclaimer, the term of this patent is extended or adjusted under 35 U.S.C. 154(b) by 753 days.

(21) Appl. No.: 15/153,933

(22) Filed: May 13, 2016

(65) Prior Publication Data

US 2016/0370463 A1 Dec. 22, 2016

(30) Foreign Application Priority Data

Jun. 15, 2015 (EP) .................................... 15172076

(51) Int. Cl.
| | |
|---|---|
| *G01S 13/56* | (2006.01) |
| *G01S 13/08* | (2006.01) |
| *G01S 13/86* | (2006.01) |
| *G01S 13/87* | (2006.01) |
| *G01C 21/20* | (2006.01) |

(52) U.S. Cl.
CPC ............ *G01S 13/56* (2013.01); *G01C 21/206* (2013.01); *G01S 13/08* (2013.01); *G01S 13/867* (2013.01); *G01S 13/878* (2013.01)

(58) Field of Classification Search
None
See application file for complete search history.

(56) References Cited

U.S. PATENT DOCUMENTS

| | | | |
|---|---|---|---|
| 5,724,024 A | 3/1998 | Sonderegger et al. | |
| 6,736,231 B2 | 5/2004 | Breed et al. | |
| 6,753,780 B2 | 6/2004 | Li | |
| 7,663,502 B2 | 2/2010 | Breed | |
| 2006/0250278 A1* | 11/2006 | Tillotson ................. | G08G 1/14 340/932.2 |

(Continued)

FOREIGN PATENT DOCUMENTS

| | | |
|---|---|---|
| EP | 0 560 351 A2 | 9/1993 |
| EP | 0 560 351 A3 | 9/1993 |

OTHER PUBLICATIONS

Patentability Search Report dated Feb. 6, 2015 in PANGEA3 Ref.: P07227.

(Continued)

*Primary Examiner* — Marcus E Windrich
(74) *Attorney, Agent, or Firm* — Xsensus LLP

(57) ABSTRACT

A detection device for detecting the presence of a living being at a predetermined location within a monitored area comprises an evaluation unit configured to evaluate radar radiation received by a radar unit from an assigned radar area included in said monitored area in response to radar radiation emitted by said radar unit to detect if a living being is present within said radar area and to localize a detected living being within said radar area, and a detection unit configured to correlate the location of a detected living being in said radar area with a set of predetermined locations in said monitored area to detect the presence of a living being at a predetermined location of said monitored area.

19 Claims, 9 Drawing Sheets

(56) References Cited

U.S. PATENT DOCUMENTS

| | | | |
|---|---|---|---|
| 2008/0074307 A1 | 3/2008 | Boric-Lubecke | |
| 2009/0262006 A1 | 10/2009 | McNeill et al. | |
| 2011/0082714 A1 | 4/2011 | Gaikwad | |
| 2012/0235579 A1* | 9/2012 | Chemel | F21V 21/15 315/152 |
| 2012/0242492 A1 | 9/2012 | Grunfeld | |
| 2013/0002434 A1 | 1/2013 | Cuddihy et al. | |
| 2014/0019200 A1* | 1/2014 | Argue | G06Q 30/02 705/7.29 |
| 2014/0210646 A1* | 7/2014 | Subramanya | B61L 29/28 340/928 |
| 2014/0218527 A1* | 8/2014 | Subramanya | G08G 1/143 348/148 |
| 2014/0316261 A1* | 10/2014 | Lux | A61B 5/0022 600/430 |
| 2015/0120340 A1* | 4/2015 | Cheatham, III | G06Q 10/02 705/5 |
| 2016/0311388 A1* | 10/2016 | Diewald | G01S 13/04 |

OTHER PUBLICATIONS

Patentability Search Report dated Apr. 13, 2015 in PANGEA3 Ref.: P07227.

Philipp Galdia, et al., "Localization of Passengers Inside Intelligent Vehicles by the Use of Ultra Wideband Radars" http://download.springer.com/static/pdf/164/chp%253A10.1007%252F978-3-642-27183-0_11.pdf?auth66=1423215649_2080add7d3f6d107ce187281c0ddd221&ext=.pdf, SIP 2011, CCIS 260, 2011, pp. 92-102.

Go Shingu, et al., "Human Body Detection Using MIMO-UWB Radar Sensor Network in an Indoor Environment" http://ieeexplore.ieee.org/xpl/articleDetails.jsp?arnumber=4711014, IEEE Computer Society, 2008, pp. 437-442.

R.O. Lane, et al., "Detecting Personnel in Wooded Areas Using MIMO Radar." http://ieeexplore.ieee.org/xpl/articleDetails.jsp?tp=&arnumber=4784023&queryText%3DDetecting+personnel+in+wooded+areas+using+MIMO+radar, Oct. 2007, pp. 1-2.

Enrico M. Staderini, "UWB Radars in Medicine" IEEE AESS Systems Magazine, Jan. 2002, pp. 13-18.

Yu Zhang, et al.,"A Fast and High-Resolution Multi-Target Localization Approach in MIMO Radar" International Journal of Advanced Robotic Systems, DOI: 10.5772/56651, vol. 10, 2013, pp. 1-8.

"Horizonte Indoor Navigation System" Heise Technology Review, Jun. 2014, pp. 70-74.

Fadel Adib, et al., "Multi-Person Motion Tracking Via RF Body Reflections" Computer Science and Artificial Intelligence Laboratory Technical Report, MIT-CSAIL-TR-2014-008, Apr. 26, 2014, pp. 1-14 and Cover page.

Extended European Search Report dated Feb. 23, 2017 in Patent Application No. 16174494.1.

\* cited by examiner

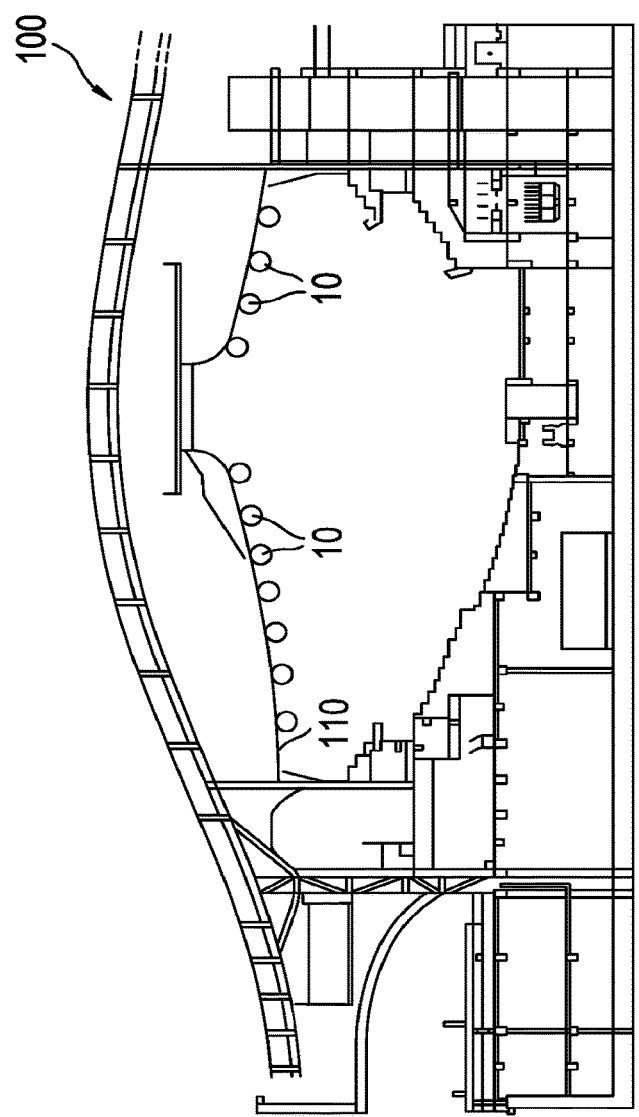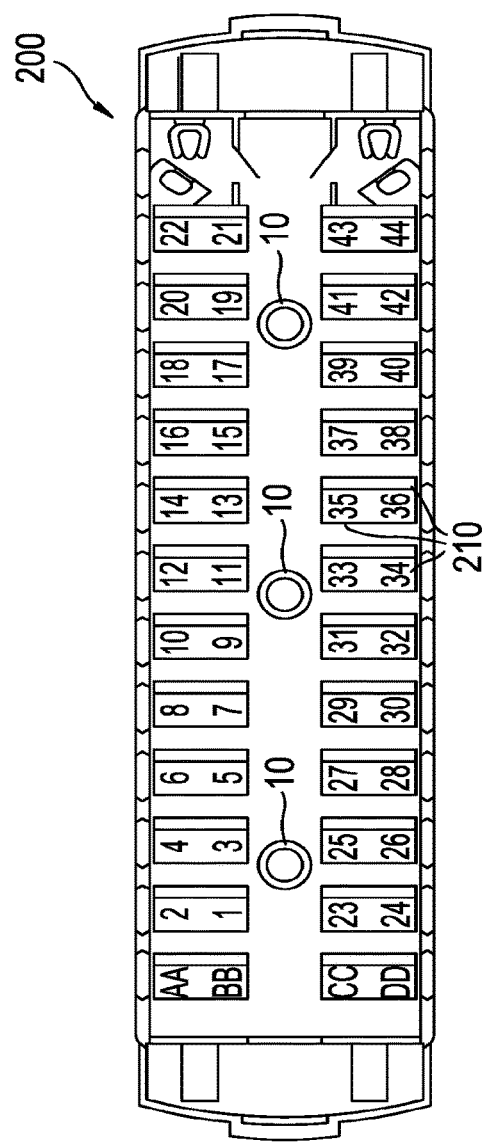

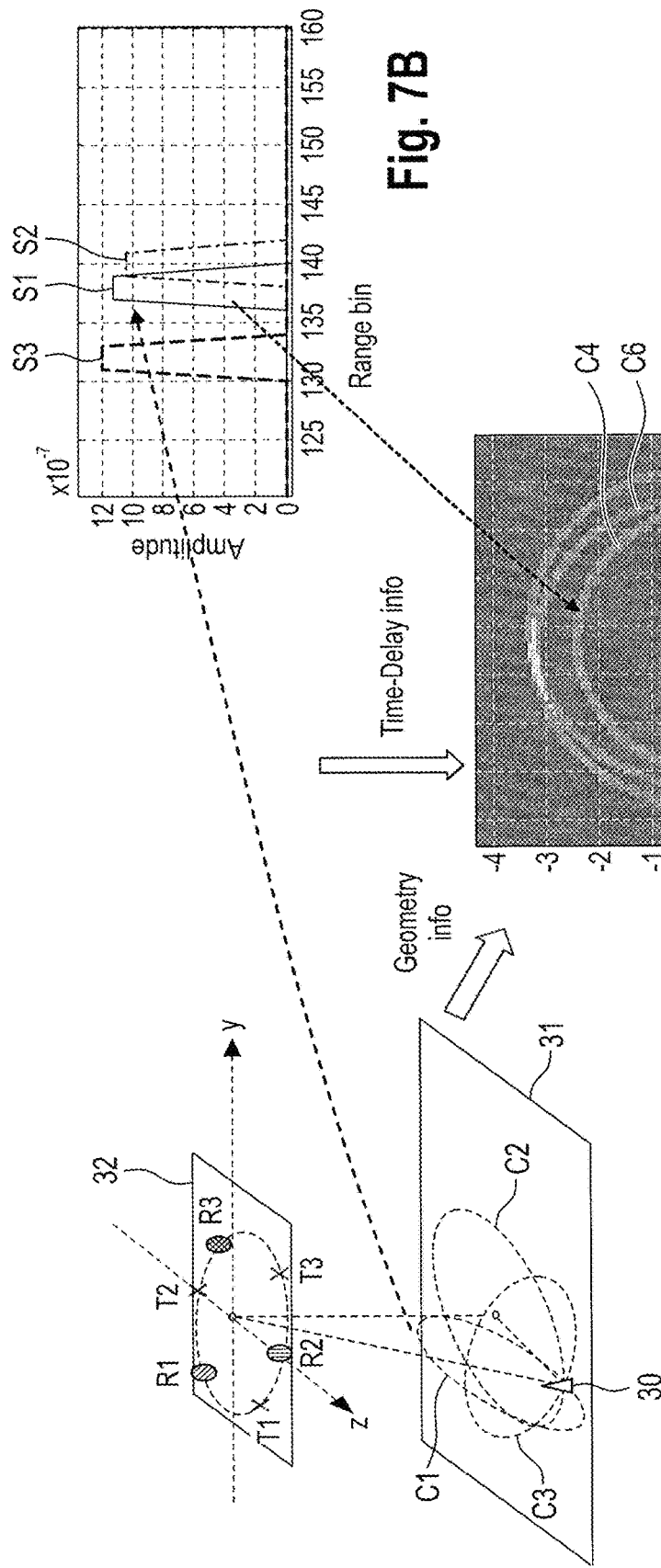

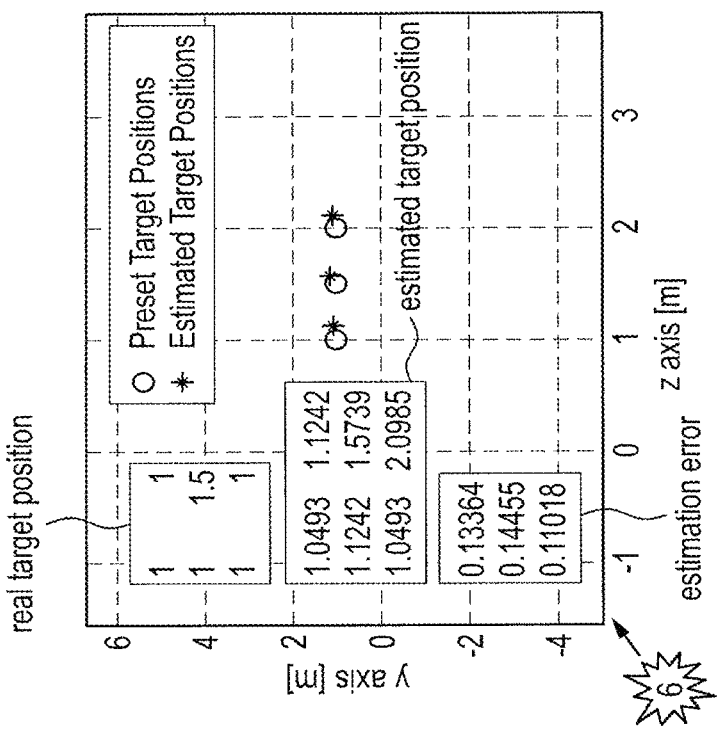
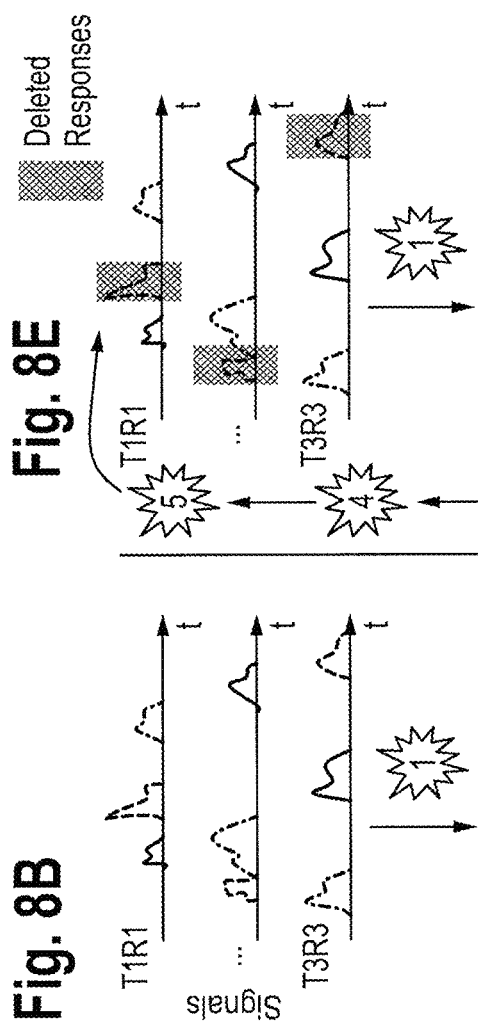
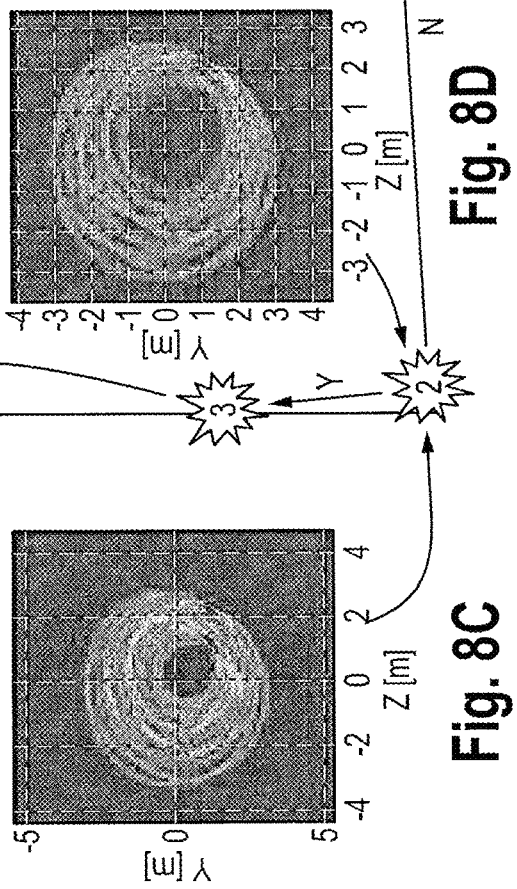
Fig. 8B
Fig. 8E
Fig. 8C
Fig. 8D
Fig. 8F

DETECTION DEVICE, SYSTEM AND METHOD FOR DETECTING THE PRESENCE OF A LIVING BEING

BACKGROUND

Field of the Disclosure

The present disclosure relates to a detection device, a corresponding detection method and a system for detecting the presence of a living being at a predetermined location within a monitored area. The present disclosure relates further to a guidance device and a corresponding method for guiding a user to a predetermined location.

Description of Related Art

Today, if a customer is entering a train, concert hall, cinema, arena or any other room (generally referred to as "monitored area" herein) without seat-place reservation, there is no application supporting him to identify or localize available seats. When e.g. entering a train, it would be interesting to know where the next available seating place is. When entering a concert hall or a cinema the customer is usually faced with the dark environment, and it is difficult for him to identify available seats. Walking around and searching an available seat may disturb other customers enjoying the event. Hence, there is a demand of a "free seat finding" application and navigation to the identified seat.

Further, there are other situations in which it may be desirous in to be able to detect the presence of a living being at a predetermined location within a monitored area, e.g. which cabin for changing clothes is free in a sports hall or swimming hall or where the shortest waiting line of a plurality of waiting lines can be found (e.g. if it is not possible to see or overlook all waiting lines).

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a detection device, a corresponding detection method and a system for detecting the presence of a living being at a predetermined location within a monitored area, which are accurate, inexpensive, foolproof and unobtrusive. It is a further object to provide a corresponding computer program for implementing said detection method and a non-transitory computer-readable recording medium for implementing said detection method.

It is a further object to provide a guidance device and a corresponding method for guiding a user to a predetermined location in an easy but accurate manner, even in difficult visibility conditions.

According to an aspect there is provided a detection device for detecting the presence of a living being at a predetermined location within a monitored area, said detection device comprising:

an evaluation unit configured to evaluate radar radiation received by a radar unit from an assigned radar area included in said monitored area in response to radar radiation emitted by said radar unit to detect if a living being is present within said radar area and to localize a detected living being within said radar area, and a detection unit configured to correlate the location of a detected living being in said radar area with a set of predetermined locations in said monitored area to detect the presence of a living being at a predetermined location of said monitored area.

According to another aspect there is provided a system for detecting the presence of a living being at a predetermined location within a monitored area, said system comprising:

at least one radar unit configured to emit radar radiation to an assigned radar area included in said monitored area and to receive radar radiation from said radar area, and a detection device as disclosed herein for detecting the presence of a living being at a predetermined location within a monitored area based on the radar radiation received by said at least one radar unit.

According to still further aspects a corresponding detection method, a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the disclosed detection method, the system, the disclosed computer program and the disclosed computer-readable recording medium have similar and/or identical preferred embodiments as the claimed detection device and as defined in the dependent claims.

One of the aspects of the disclosure is to make use of one or more radar units to detect vital signs (VS), in particular respiration and/or heartbeat, of a living being present in the radar area of the respective radar unit (i.e. in the area into which radar radiation is emitted and from which radar radiation is received by the radar unit). Such vital signs can be derived from received radar radiation (i.e. radar radiation that is reflected by a living being, sometimes also referred to as radar reflections or radar signal reflections) by detecting periodic motion caused by respiration and/or heartbeat, in certain frequency ranges, for which purpose distance information is obtained from the received radar radiation.

Referring to the above mentioned example, one or more radar units may be mounted on the train's ceiling to monitor the cabin (i.e. the "monitored area") of the railcar. It is thus possible to identify seats (representing the predetermined locations within the monitored area), which are occupied and which are not occupied by living beings (in particular passengers), since from an area of a seat, which is not occupied by a living being, no vital signs can generally be detected. Non-occupied seats may then be memorized as available, and this information may be forwarded e.g. to the passengers waiting on the platform before the train arrives to let them group in front of the railcar with available seats. Thus, entering a train without seat reservation will be much less cumbersome as usual, particularly if the train is busy and passengers do not know where to find available seats.

The disclosed ideas are also applicable in many different scenarios apart from trains, e.g. in concert halls or arenas, where people (late-comers) have to identify available seats even at low illuminations, or in shopping centers or supermarkets, where people want to find the waiting line with the least number of people waiting.

According to a further aspect of the present disclosure there is provided a guidance device, which may e.g. be a dedicated device (e.g. fixedly mounted to the trains, planes or buildings infrastructure) or a wearable user device running a particular application, such as a smartphone or tablet, for guiding a user to a predetermined location, the device comprising:

a receiving unit configured to receive a location information indicating one or more predetermined locations of a set of predetermined locations, at which no living being is present, in particular from a detection device as or a radar system as disclosed herein, a way determining unit configured to determine the way from the current location to one of the one or more predetermined locations indicated by said location information, and a guidance issuing unit configured to issue guidance information for guiding a user from the current location to said one predetermined location.

According to a further aspect of the present disclosure there is provided a method for guiding a user to a predetermined location, the method comprising:

receiving a location information indicating one or more predetermined locations of a set of predetermined locations, at which no living being is present, in particular from a detection device or a radar system as disclosed herein, determining the way from the current location to one of the one or more predetermined locations indicated by said location information, and issuing guidance information for guiding a user from the current location to said one predetermined location.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2 shows an implementation of the disclosed system in a concert hall, FIG. 3 shows another implementation of the disclosed system in a train, FIG. 7A illustrates target responses arriving at a sensor unit, FIG. 7B illustrates a relationship between signal range and amplitude, FIG. 7C illustrates a position of a target at an intersection between circles representing the geometry information and the time-delay information, FIG. 8B illustrates step S10 of FIG. 8A, FIG. 8C illustrates step S11 of FIG. 8A, FIG. 8D illustrates step S12 of FIG. 8A, FIG. 8E illustrates step S13 and S14 of FIG. 8A, FIG. 8F illustrates step S15 of FIG. 8A.

DETAILED DESCRIPTION OF THE EMBODIMENTS

Figure 1:
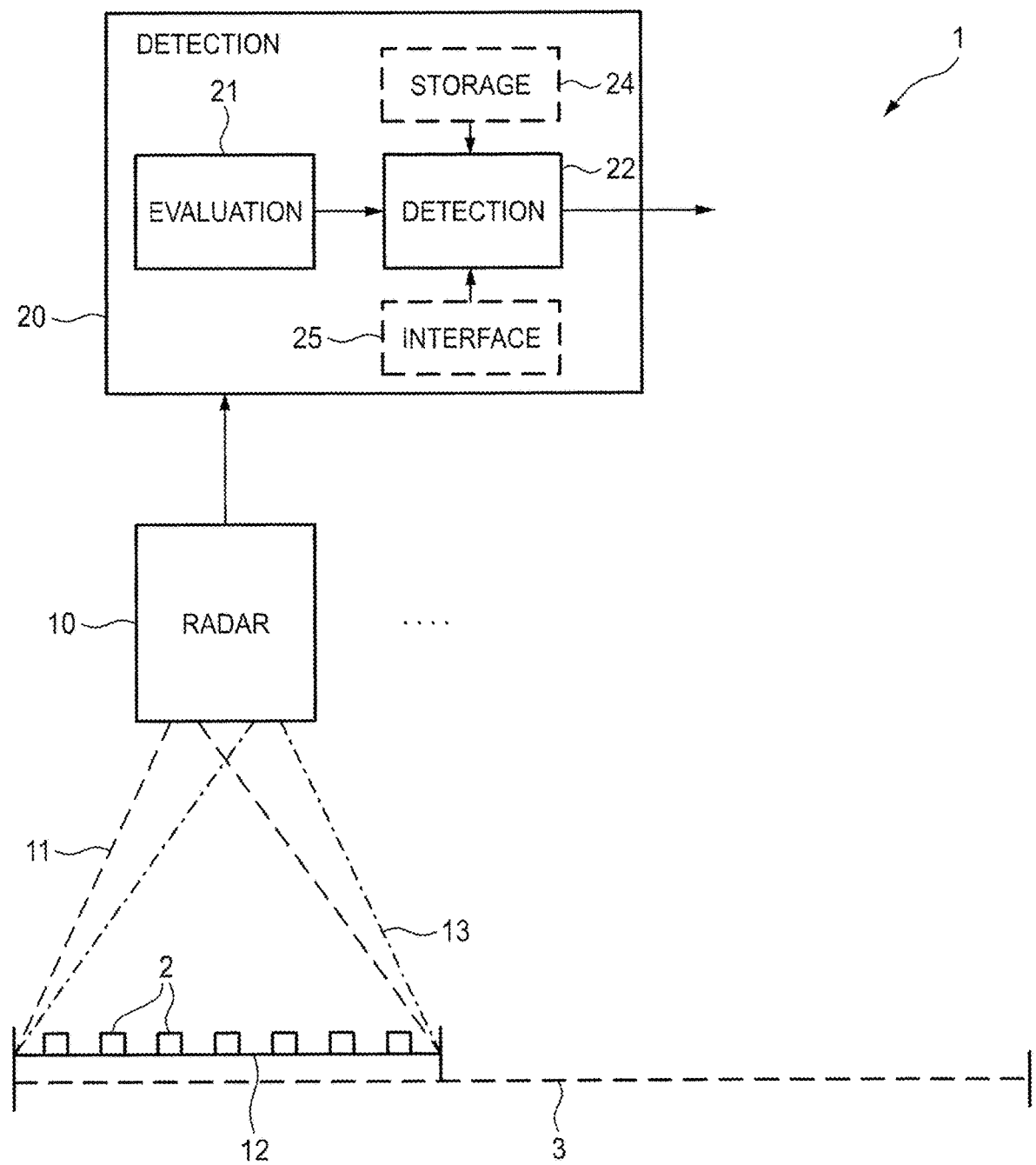
FIG. 1 shows a schematic diagram of a first embodiment of a system and a detection device according to the present disclosure.

Referring now to the drawings, wherein like reference numerals designate identical or corresponding parts throughout the several views, FIG. 1 shows a schematic diagram of a first embodiment of a system 1 and a detection device according to the present disclosure. The system 1 for detecting the presence of a living being at a predetermined location 2 within a monitored area 3 comprises at least one radar unit 10 that is configured to emit radar radiation 11 to an assigned radar area 12 included in said monitored area and to receive radar radiation 13 from said radar area 12. Further, the system 1 comprises a detection device 20 (also called detection unit herein) as disclosed herein for detecting the presence of a living being at a predetermined location 2 (or, more generally, for detecting the presence of one or more living beings at one or more predetermined locations) within the monitored area 3 based on the radar radiation 13 received by said at least one radar unit 10.

The radar area 12 represents the area into which radar radiation is (substantially) emitted and from which radar radiation (reflected by one or more targets such as one or more living beings) is (substantially) received. The monitored area 3 represents the area that is monitored by the system 1 and corresponds to the radar area 12 (in case of a single radar unit) or to the combination of all radar areas (in case of two or more radar units). The predetermined location represents a particular location, at which a living being (in particular a person) may be present or not.

The radar unit 10 preferably comprises at least two collocated antennas for emitting and receiving radar radiation or at least two sets of a transmitting antenna for emitting radar radiation and a receiving antenna for receiving radar radiation. This is particularly the case if the system 1 comprises a single radar unit 10 only in order to be able to localize a target (i.e. a living being her in this context). If the system 1 comprises two or more radar units, each radar unit may alternatively comprise a single collocated antenna or a single set of a transmitting antenna and a receiving antenna.

The detection device 20 uses the radar radiation (i.e. the radar reflections) received by the radar unit 10 for detecting the presence of a living being at a predetermined location 2 within the monitored area 3. It comprises an evaluation unit 21 configured to evaluate radar radiation 13 received by the radar unit 10 from an assigned radar area 12 included in said monitored area 3 in response to radar radiation 11 emitted by said radar unit 10 to detect if a living being is present within said radar area 12 and to localize a detected living being within said radar area 12. Further, it comprises a detection unit 22 configured to correlate the location of a detected living being in said radar area 12 with a set of predetermined locations in said monitored area 3 to detect the presence of a living being at a predetermined location of said monitored area 3.

Hereby, a set of predetermined locations in said monitored area 3 may be an arrangement of seats e.g. in, a theatre, a concert hall or a train. FIG. 2 shows an implementation of the disclosed system in a concert hall 100, in which a plurality of radar units 10 are mounted at a distance from each other to the ceiling 110 of the concert hall 100. FIG. 3 shows another implementation of the disclosed system in a train, in which several radar units 10 are mounted at a distance from each other to the ceiling of a railcar 200 to determine if the various seats 210 are occupied or not.

In such applications it is thus determined by the disclosed detection device if a seat is occupied or not. Hereby, detecting the presence of a living being at a predetermined location shall be understood such that is detected if a living being is present at a predetermined location or if a living being is not present, i.e. in the above example if a seat is occupied by a person or if the seat is free.

The detection device may be implemented in software, hardware or a mixture of soft- and hardware. Preferably, the detection device is implemented on a processor or computer, which is programmed accordingly.

Radar systems can measure distances to persons as well the speed of their movements. This allows localizing one or more persons if multiple antennas or radar units are used. Focusing the transmit energy of a radar beam into a direction or angle is called beamforming. A receiver might also sense signals from various directions and record the azimuth or elevation of their origin. If distance and direction to or from a target is known, it is localized.

Back-projection is another algorithm to localize targets in a room. The concept of back-projection will be explained below.

After localization, movements of one or more persons can be tracked using Kalman filters. This enables to follow the position of a person even if the person is e.g. hidden for a short moment in time or the series of radar records is interrupted.

Periodic movements like the lifting of the chest caused by respiration or the heartbeat can also be detected by the radar. These periodic movements are called vital signs and the post processing inside the radar is called Vital Sign Detection (VSD). In heavy sports applications these numbers might even be exceeded. In daily situations the top range of these values is usually not reached. The received radar information may be filtered accordingly to search for such a periodic signal. This filtering removes clutter and reflections from static objects. The presence of the periodic signal is detected as the vital sign. Kalman filters might support tracking of the periodic movement.

The disclosed system, method and device may be used at places where a fixed, permanent seating is installed. This is e.g. the case inside a train. Here, all seating locations are known to the detection device (or to the train operator). The seating location information may be overlaid with the localization information obtained by the detection device (i.e. the information which location is occupied by a living being and which is not occupied) in order to enhance localization performance. Persons may thus be mapped on the seating raster. Standing persons generally show a weaker vital sign to radar sensors mounted on the ceiling of a room. Depending on the application of the disclosed teaching, these persons can be ignored, because they are not occupying a seat.

Figure 4:
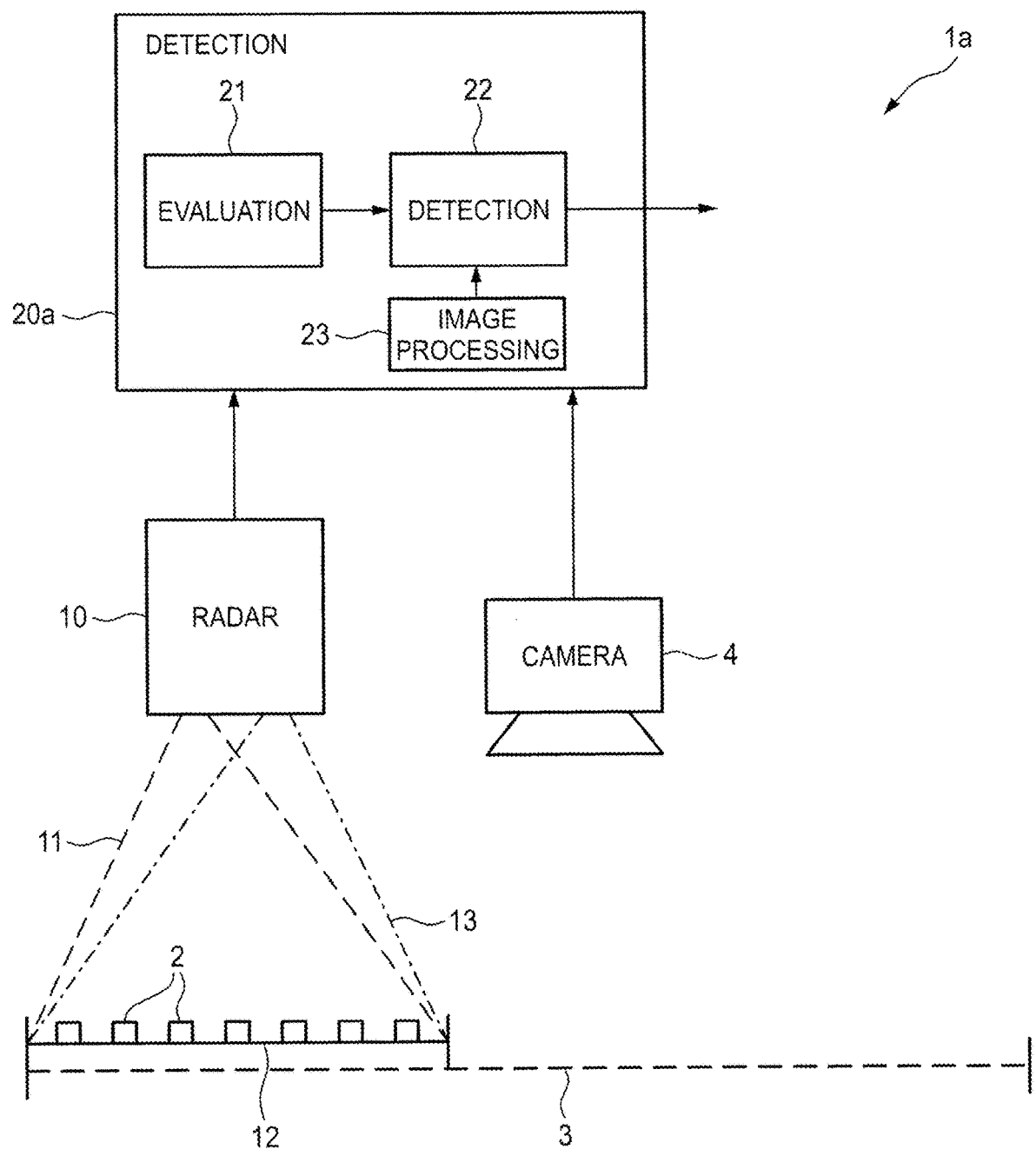
FIG. 4 shows a schematic diagram of a second embodiment of a system and a detection device according to the present disclosure.

Places like a town hall or a sports arena can be used for multiple events, where an individual seating installation may set-up that changes from one event to the other. There may be seating installations for a dining event, where tables are present. Alternatively there may be a seating installation for a concert or cinema event, where all chairs are arranged in rows. A optical camera 4, as provided in another embodiment of the disclosed system 1a schematically shown in FIG. 4, might snapshot such flexible seating installations just before the event, as long as there are good illumination conditions. This image can be used as input to the detection device 20a comprising an image processing unit 23 for image processing of the obtained image(s) in order to identify the given localisation of the chairs and to define the raster where persons will be seated during the event. During the event the illumination might change to darker conditions, where an optical detection of persons might no longer be possible, i.e. the optical camera can no longer be used to identify if a chair is occupied or not. Hence, in this embodiment system 1a uses an imaging system, e.g. a camera 4, to acquire one or more images of the monitored area 3 and the detection device 20a uses an image processing unit 23, which may also be implements in soft- and/or hardware, e.g. in software on a processor or computer, to process the acquired one or more images of the monitored area 3 to obtain the set of predetermined locations (e.g. in this example the seating raster of the chairs) of the monitored area 3.

In an alternative embodiment the set of predetermined locations (e.g. the arrangement of the chairs) may be registered by use of the radar radiation received by the radar unit 10 by scanning the empty monitored area 3 (i.e. without any persons being present) before the event starts. Thus, in such an embodiment no imaging system and no image processing unit are required, but system 1 and the detection device 20 shown in FIG. 1 can be used.

Still further, in an embodiment the set of predetermined locations may be obtained in advance (in any possible way) and may be stored, or the predetermined locations may be determined and given e.g. on a computer used to determine the predetermined locations (e.g. the seating raster of a room). The predetermined locations may also be fixed (like in a theatre or cinema) so that the predetermined locations are fixed. Accordingly, in an embodiment a storage unit 24 may optionally be provided as part of the detection device 20, as shown in dashed lines in FIG. 1, which is configured to store said set of predetermined locations in said monitored area. Alternatively or additionally, the detection device 20 may comprise an interface 25, also shown in dashed lines in FIG. 1, for obtaining and/or accessing said set of predetermined locations, which may be stored in an external storage unit, e.g. on a computer of the event operator, on a server accessible via the internet or generally in the cloud.

The proposed radar system and detection device provide the advantage that for the detection of the presence of a person at a predetermined location within a monitored area an (optical) imaging system, such as a camera, is not required. Acquiring images of a person is generally obtrusive and might infringe the privacy of the person, because he or she is imaged, which per se is often undesired by the person, and because the information about the presence of the person to the event might be reused later, which may not be in the interest of the person. A radar measurement, in contrast, as provided according to the present disclosure, is generally unobtrusive, does not identify a person and, hence, does not infringe the privacy of the person.

Figure 5:
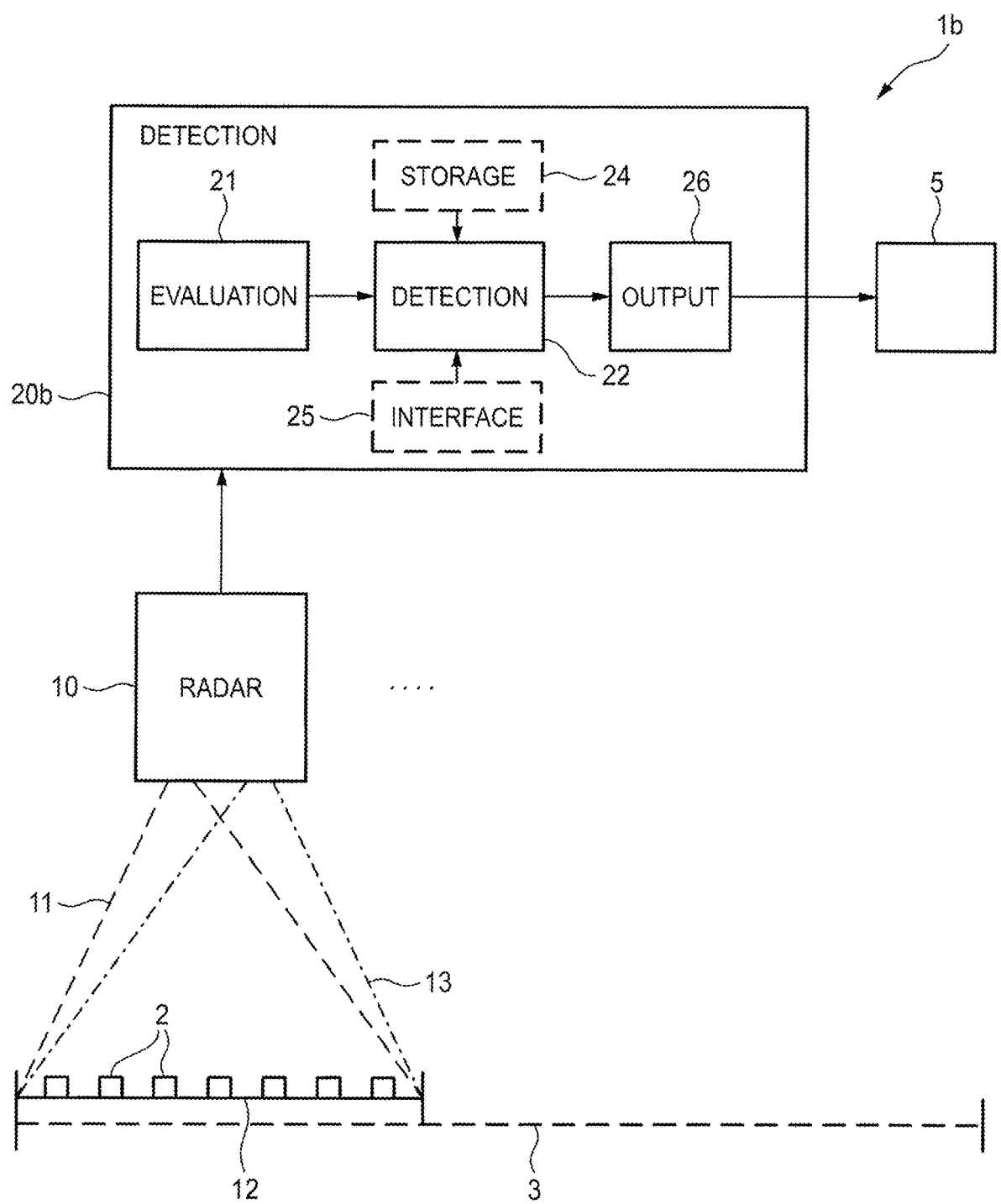
FIG. 5 shows a schematic diagram of a third embodiment of a system and a detection device according to the present disclosure.

The disclosed combination of both technologies, localisation and vital signs detection, can thus be used to identify non-available (occupied) seats in any concert hall, sports arena, train, etc. Vice versa, if the allocated seats as well all seat localizations are known, the available (non-occupied) seats can be identified. In an embodiment the information of the localization of available seats may be made available to the user of the system, which might e.g. be the customer entering the room or vehicle and/or the operator of the event or vehicle. For this purpose, in another embodiment the system 1b comprises, as shown in FIG. 5, a user interface 5 that is configured to issue user information about the location, number and/or direction of predetermined locations within the monitored area that are occupied by a living being and/or that are not occupied by a living being. Accordingly, the detection device 20b in this embodiment comprises an output unit 26 that is configured to output information about the location, number and/or direction of predetermined locations within the monitored area that are occupied by a living being and/or that are not occupied by a living being. In other words, the output information is determined by the output unit 26 of the detection device 20b and is then provided (e.g. transmitted to or obtained from the user interface 5), which issues this information, optionally after further processing, as user information.

For instance, in the use scenario of a train (see FIG. 3) the information about the number of available seats and the corresponding railcars might be shown on a display (as an example of a user interface 5) to the customers waiting on the platform before the train approaches. Customers might thus go to the location of the door of the railcar where seats are available. If there are also reserved seats, these have to be considered when giving the information to the customer. Alternatively or additionally, when entering the train electronic signs might inform the customer how many seats he will find going to the left or the right side, which may be indicated by simple indications (e.g. red or green arrows close to the entrance or even within the whole railcar, indicating which direction to go or even showing the way to a free seat) or by another display close to the entrance of the railcar. Thus, the system may comprise a user interface (which may be the same as or different from the user interface 5) that is configured to issue user information guiding a user to a non-occupied predetermined location and/or an area of non-occupied predetermined locations.

In other application scenarios, e.g. in the case of a concert hall, the localization of all seats plus the localization of available seats might be forwarded to a wearable user device, e.g. the user's smartphone running e.g. a "seating application". Any indoor navigation application may then guide the user on the way to an available seat with minimal disturbance to other persons. Such a "seating application" might also search for two or multiple adjacent seats available.

Figure 10:
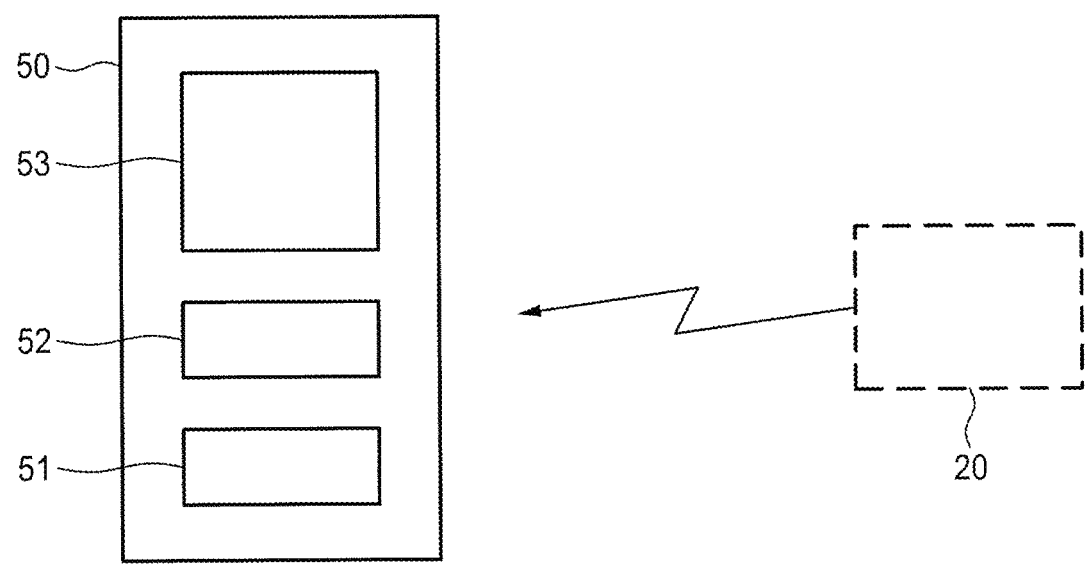
FIG. 10 illustrates a schematic diagram of an embodiment of a guidance device according to the present disclosure.

A schematic diagram of an embodiment of a guidance device according to the present disclosure is shown in FIG. 10. The guidance device 50 may be a separate device that is particularly made for this purpose and that may comprise suitable hard- and/or software, but it may also be a wearable device, such as a smartphone, tablet or mobile navigation device, that is running a corresponding software, such as an application program ("app"). This guidance device might e.g. be a beamer device projecting arrows to the floor showing the direction where seats are available. It may also be an electronic picture frame mounted to the wall indicating in which direction how many free seats are available and/or into which direction passengers should go.

The guidance device 50 comprises a receiving unit 51 configured to receive a location information indicating one or more predetermined locations of a set of predetermined locations, at which no living being is present. Hereby, the location information is preferably determined and provided by a detection device or a radar system as disclosed herein, which transmits the location information in any suitable form to the guidance device 50, e.g. via a communications (e.g. mobile telephone) network or a computer network (e.g. a WiFi network), or which provides the location information at a predetermined storage space, e.g. on a server or in the cloud, for use (e.g. via download or remote access) by the guidance device 50. The receiving unit 51 is appropriately configured for this purpose, e.g. comprises communication means, download means, and/or access means.

The guidance device 50 further comprises a way determining unit 52 configured to determine the way from the current location to one of the one or more predetermined locations indicated by said location information. This way determining unit 52 may comprise or make use of a navigation tool, e.g. a navigation program as provided on many smartphones, which can use a existing navigation system (e.g. an indoor navigation system or a satellite navigation system) to determine the current location and calculate the way to the predetermined location.

Still further, the guidance device 50 further comprises a guidance issuing unit 53 configured to issue guidance information for guiding a user from the current location to said one predetermined location. The guidance issuing unit 53 may e.g. comprise a display (e.g. the display of a smartphone) and/or a loudspeaker. The guidance device and method may be used in various scenarios. For instance, the predetermined location may be an empty seat, but may also be an emergency exit, an empty waiting line, an available dressing room or toilet, etc.

Figure 6:
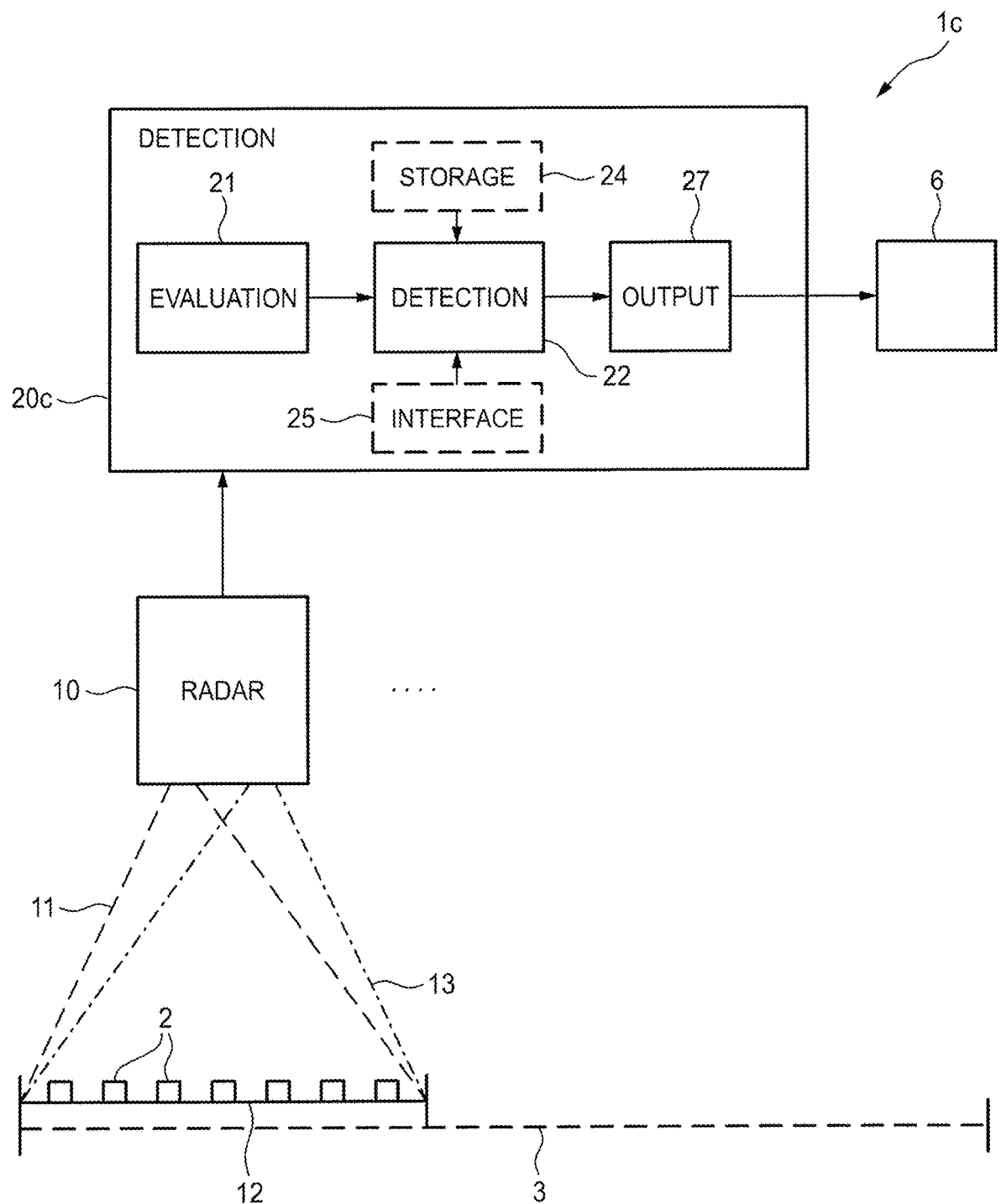
FIG. 6 shows a schematic diagram of a fourth embodiment of a system and a detection device according to the present disclosure.

Another benefit of the radar based localization as applied according to the present disclosure is that it also works in the case of a fire or emergency situation where a lot of smoke is inside the room and/or if the illumination is off and/or, in an outdoor application, if it is night time and, hence, dark. Radar waves penetrate smoke and do also not require light. The radar based vital signs detection can thus also be used as an emergency system, in which the presence of a living being as well as the location may be detected in such an emergency situation. Hence, in a corresponding embodiment of the system 1c as shown in FIG. 6, an emergency interface 6 may be provided that is configured to issue emergency information guiding emergency staff, such as a firefighter, to locations at which the presence of a living being has been detected. Accordingly, the detection device 20c in this embodiment comprises an output unit 27 (which may be the same as the output unit 26 of the detection device 20c) that is configured to output information about the presence and location of detected living beings within said monitored area. In other words, the emergency information is preferably determined by the output unit 27 of the detection device 20c and is then provided (e.g. transmitted to or obtained from the emergency interface 6), which issues this information, optionally after further processing, as emergency information.

The detection might show uncertainties if monitoring e.g. a tribune during a sports or music event where multiple people cause vibrations to the tribune by hopping with the beat or rhythm of the event. Hereby, an empty seat is also vibrating and may cause similar periodic reflections to the detection than the vital sign. To overcome this challenge, the evaluation unit 21 may be configured to compare multiple periodic signals derived from the received radar radiation to distinguish a periodic signal caused by respiration and/or heartbeat of a living being from other periodic signals caused by other motion (in this example the vibrations of the seats) within the radar area. Hence, the records of multiple persons may be compared. Usually, the vital signs signal(s) is (are) individual for every person. If many locations show an identical vital sign, this can be interpreted as an non-vital signs signal (e.g. caused by vibration of the building structure) and may thus be subtracted or otherwise ignored from the recorded signals.

Empty seats might also be identified by the detection device by measuring the distance from the ceiling to the seat. An allocated seat will show a shorter distance record to the radar than an empty seat. This enables to realize the application described here without detection of vital signs. Hence, in an embodiment said evaluation unit 21 may be configured to detect if a living being is present within said radar area by measuring the distance to said predetermined locations within said radar area from the received radar radiation. To further increase the performance and avoid false detections both concepts may be used together.

In the following the algorithm of back-projection, which may be used for localization of a living being according to the present disclosure, shall be briefly explained with reference to FIGS. 7A-7C (illustrating the principle of back-projection) and FIGS. 8A-8F (localization of multiple targets).

Back-projection is a kind of radar signal processing technique delivering the location of objects identified. As shown in FIG. 7A, it is supposed that there is a target 30 in the scene 31. The target responses will arrive at the receivers (e.g. R1, R2 and R3) of the sensor unit 32 (comprising transmitters T1-T3 and receivers R1-R3) at a different time delay due to the differences of the spatial positions of the transmitters and receivers. These signals are shown in FIG. 7B. The responses of one or more targets/scatterers along an equal-range circle C1, C2, C3 (also expressed as $\Sigma_i$Response (tgt$_i$)) will come to each receiver at the same time. For instance, the signal S1 represents the signals reflected by the targets/scatterers along equal-range circle C1 (in FIG. 7A). A signal arrival indicates that the target is located on the equal range circle which is shown on the target plane (at a distance at which targets are expected) in FIG. 7C. In particular, a circle (or ellipse) may be be drawn via the time-delay information of $\Sigma_i$Response(tgt$_i$), and the geometry information (taking T1-R1 as focal points). All the values along the drawn circle are identical: $\Sigma_i$Response (tgt$_i$). Multiple circles could be drawn via different combinations of focal points, e.g. T1-R1 (circle C4), T1-R2 (circle C5), T1-R3 (circle C6), etc. Peaks 33 will appear at the target positions (tgt$_i$=tgt$_j$=tgt$_k$), i.e. $\Sigma_i$Response(tgt$_i$)+ $\Sigma_j$Response(tgt$_j$)+$\Sigma_k$Response(tgt$_k$). Hence, in back-projection, all the target responses in the received signals (e.g. as shown FIG. 7B) are back-projected on the target plane. As a consequence, several circles or ellipses appear after back-projection operation (e.g. as shown in FIG. 7C). The intersection of the circles (i.e. the peak 33) is the position of the target.

Figure 8A:
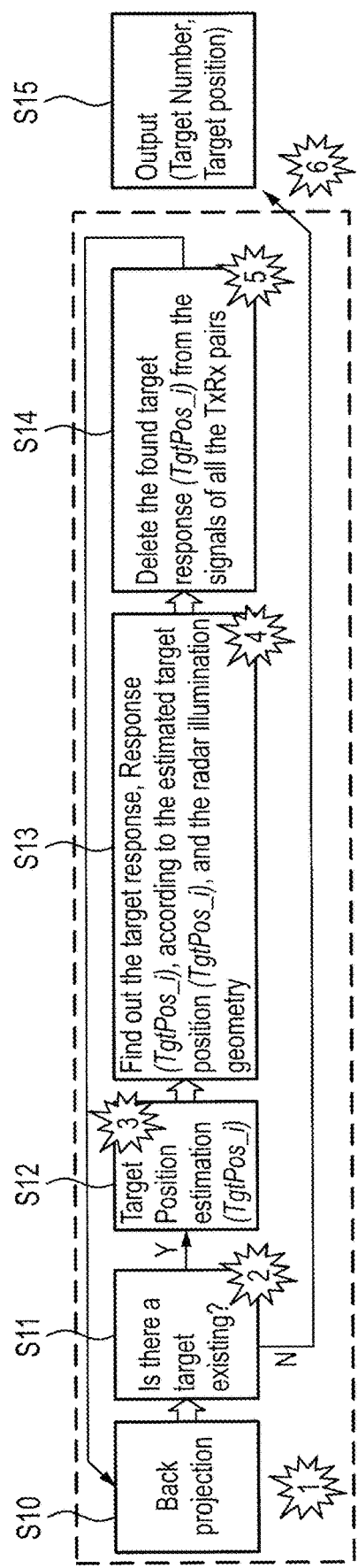
FIG. 8A illustrates a flow chart of a localization of multiple targets.

FIG. 8A shows a flow chart of multiple targets localization. Using the algorithm shown in FIGS. 7A-7C, back-projection is performed first in step S10 to obtain signals as shown in FIG. 8B. If there is a target existing in the scene (step S11; FIG. 8C), a target position estimation (e.g. TgtPos i) could be obtained (step S12; FIG. 8D). Then, the target responses related to the position TgtPos_i are found out and deleted from signals received by all the receivers (steps S13, S14; FIG. 8E). In this way, interferences from the already detected target (e.g. TgtPos_i) are suppressed. The, the algorithm goes back to the first step S10, performs similar operations again until all targets are detected and localized. Finally, target numbers and positions are outputted (step S15; FIG. 8F).

Figure 9:
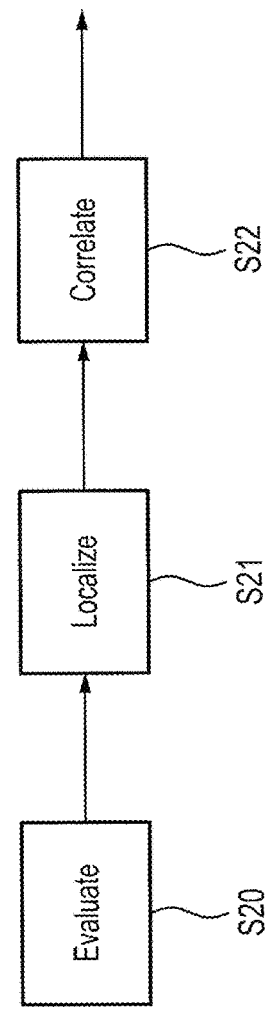
FIG. 9 illustrates a flowchart of a detection method according to the present disclosure.

FIG. 9 shows a flowchart of an embodiment of a detection method for detecting the presence of a living being at a predetermined location within a monitored area according to the present disclosure. Said detection method comprises a first step S20 of evaluating radar radiation received by a radar unit from an assigned radar area included in said monitored area in response to radar radiation emitted by said radar unit to detect if a living being is present within said radar area. In a second step S21*a* detected living being is localized within said radar area. In a third step S22 the location of a detected living being in said radar area is correlated with a set of predetermined locations in said monitored area to detect the presence of a living being at a predetermined location of said monitored area.

In summary, the disclosed system, device and method for detecting free and/or occupied locations provides the advantages that legacy rooms can be supported without changing the seating infrastructure, that the system cannot be fooled by placing any heavy load on a seat (as in applications where a load or pressure sensor is arranged within the seat to detect if it is occupied by a person), that the elements of the system are difficult or impossible to destroy or vandalize (if e.g. mounted on the room's ceiling), that customer does not see or identify the radar unit(s) and hence to not feel being monitored, and that the system also enables emergency functions to localize people that have to be rescued in the case of a fire, heavy dust, etc. Further, comfort of a customer entering any room may be enhanced.

The detection device is generally configured to use a set of predetermined locations in said monitored area, said predetermined locations indicating locations at each of which a living being may be present. Said predetermined locations may be sitting or standing positions, in particular seats in a concert hall, theatre, cinema, sports area, train, bus, ship, or airplane, positions in a cabin for changing clothes or taking a shower, positions in a waiting line, or ways to emergency exits.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors, which are programmed or configured according to software code. A circuit does not include pure software, although a circuit includes the above-described hardware executing software.

It follows a list of further embodiments of the disclosed subject matter:

1. Detection device for detecting the presence of a living being at a predetermined location within a monitored area, said detection device comprising:

an evaluation unit configured to evaluate radar radiation received by a radar unit from an assigned radar area included in said monitored area in response to radar radiation emitted by said radar unit to detect if a living being is present within said radar area and to localize a detected living being within said radar area, and a detection unit configured to correlate the location of a detected living being in said radar area with a set of predetermined locations in said monitored area to detect the presence of a living being at a predetermined location of said monitored area.

2. Detection device as defined in any preceding embodiment, wherein said evaluation unit is configured evaluate radar radiation received by two or more radar units each having an assigned radar area, the radar areas of all radar units covering the monitored area.

3. Detection device as defined in any preceding embodiment, wherein evaluation unit is configured to detect if a living being is present within said radar area by detecting periodic motion of one or more parts of the body of a living being caused by respiration and/or heartbeat of the living being.

4. Detection device as defined in any preceding embodiment, wherein said detection unit is configured to use a set of predetermined locations in said monitored area, said predetermined locations indicating locations at each of which a living being may be present.

5. Detection device as claimed in embodiment 4, wherein said predetermined locations are sitting or standing positions, in particular seats in a concert hall, theatre, cinema, sports area, train, bus, ship, or airplane, positions in a cabin for changing clothes or taking a shower, positions in a waiting line, or ways to emergency exits.

6. Detection device as defined in any preceding embodiment, further comprising a storage unit configured to store said set of predetermined locations in said monitored area and/or an interface for obtaining and/or accessing said set of predetermined locations.

7. Detection device as defined in any preceding embodiment, wherein said evaluation unit is configured to evaluate the received radar radiation by use of beamforming or back-projection to localize a detected living being within said radar area.

8. Detection device as defined in any preceding embodiment, further comprising an output unit configured to output information about the location, number and/or direction of predetermined locations within the monitored area that are occupied by a living being and/or that are not occupied by a living being.

9. Detection device as defined in any preceding embodiment, further comprising an output unit configured to output information about the presence and location of detected living beings within said monitored area.

10. Detection device as defined in any preceding embodiment, wherein said evaluation unit is configured to compare multiple periodic signals derived from the received radar radiation to distinguish a periodic signal caused by respiration and/or heartbeat of a living being from other periodic signal caused by other motion within the radar area.

11. Detection device as defined in any preceding embodiment, wherein said evaluation unit is configured to detect if a living being is present within said radar area by measuring the distance to said predetermined locations within said radar area from the received radar radiation.

12. Radar system for detecting the presence of a living being at a predetermined location within a monitored area, said radar system comprising:

at least one radar unit configured to emit radar radiation to an assigned radar area included in said monitored area and to receive radar radiation from said radar area, and a detection device as defined in any preceding embodiment for detecting the presence of a living being at a predetermined location within a monitored area based on the radar radiation received by said at least one radar unit.

13. Radar system as defined in embodiment 12, wherein said at least one radar unit comprises at least two collocated antennas for emitting and receiving radar radiation or at least two sets of a transmitting antenna for emitting radar radiation and a receiving antenna for receiving radar radiation.

14. Radar system as defined in any one of embodiments 12 to 13, comprising two or more radar units each having an assigned radar area, the radar areas of all radar units covering the monitored area.

15. Radar system as defined in any one of embodiments 12 to 14, further comprising an imaging system configured to acquire one or more images of the monitored area and an image processing unit configured to process the acquired one or more images of the monitored area to obtain said set of predetermined locations of the monitored area.

16. Radar system as defined in any one of embodiments 12 to 15, further comprising a user interface configured to issue user information about the location, number and/or direction of predetermined locations within the monitored area that are occupied by a living being and/or that are not occupied by a living being.

17. Radar system as defined in any one of embodiments 12 to 16, further comprising a user interface configured to issue user information guiding a user to a non-occupied predetermined location and/or an area of non-occupied predetermined locations.

18. Radar system as defined in any one of embodiments 12 to 17, further comprising an emergency interface configured to issue emergency information guiding emergency staff to locations at which the presence of a living being has been detected.

19. Detection method for detecting the presence of a living being at a predetermined location within a monitored area, said detection method comprising:

evaluating radar radiation received by a radar unit from an assigned radar area included in said monitored area in response to radar radiation emitted by said radar unit to detect if a living being is present within said radar area, localizing a detected living being within said radar area, and correlating the location of a detected living being in said radar area with a set of predetermined locations in said monitored area to detect the presence of a living being at a predetermined location of said monitored area.

20. Guidance device for guiding a user to a predetermined location, the device comprising:

a receiving unit configured to receive a location information indicating one or more predetermined locations of a set of predetermined locations, at which no living being is present, in particular from a detection device as defined in embodiment 1 or a radar system as defined in embodiment 12, a way determining unit configured to determine the way from the current location to one of the one or more predetermined locations indicated by said location information, and a guidance issuing unit configured to issue guidance information for guiding a user from the current location to said one predetermined location.

21. Guidance device as defined in embodiment 20, wherein said guidance device is a wearable device, in particular a smartphone, tablet or mobile navigation device.

22. Method for guiding a user to a predetermined location, the method comprising:

receiving a location information indicating one or more predetermined locations of a set of predetermined locations, at which no living being is present, in particular from a detection device as defined in embodiment 1 or a radar system as defined in embodiment 12, determining the way from the current location to one of the one or more predetermined locations indicated by said location information, and issuing guidance information for guiding a user from the current location to said one predetermined location.

23. A non-transitory computer-readable recording medium that stores therein a computer program product, which, when executed by a processor, causes the method according to embodiment 19 or 22 to be performed.

24. A computer program comprising program code means for causing a computer to perform the steps of said method according to embodiment 19 or 22 when said computer program is carried out on a computer.

The present application claims priority to European Patent Application 15172076.0 filed by the European Patent Office on 15 Jun. 2015, the entire contents of which being incorporated herein by reference.

The invention claimed is:

1. A detection device, comprising:
processing circuitry configured to:
evaluate radar radiation, received by a single radar unit in response to radar radiation emitted by the radar unit throughout a radar area, by using back-projection to determine whether a first living being is present within the radar area, determine whether a second living being is present within the radar area, and localize the first and second living beings within the radar area, the radar area including a set of predetermined locations;
correlate locations of each of the first and second living beings in the radar area with the set of predetermined locations located in the radar area to detect whether the first living being is present at a first predetermined location of the set of predetermined locations and to detect whether the second living being is preset at a second predetermined location of the set of predetermined locations; and
output a predetermined location, of the set of predetermined locations, in which a living being is not present based on the correlation of the locations of each of the first and second living beings with the set of predetermined locations.

2. The detection device as claimed in claim 1, wherein the processing circuitry evaluates radar radiation received by another radar units that has an assigned radar area different than an area of the single radar unit, the radar areas of all radar units covering a monitored area that includes the radar areas.

3. The detection device as claimed in claim 1, wherein the processing circuitry detects whether the first living being is present within the radar area by detecting periodic motion of one or more parts of a body of the first living being caused by respiration and/or heartbeat of the first living being.

4. The detection device as claimed in claim 1, wherein the set of predetermined locations includes sitting or standing positions in a concert hall, theatre, cinema, sports area, train, bus, ship, or airplane, positions in a cabin for changing clothes or taking a shower, positions in a waiting line, or ways to emergency exits.

5. The detection device as claimed in claim 1, further comprising a storage configured to store the set of predetermined locations and/or an interface for obtaining and/or accessing the set of predetermined locations.

6. The detection device as claimed in claim 1, further comprising a display, wherein
the processing circuitry is configured to control the display to output information indicating the predetermined location.

7. The detection device as claimed in claim 1, wherein the processing circuitry is configured to compare multiple periodic signals derived from the received radar radiation to distinguish a periodic signal caused by respiration and/or heartbeat of a living being from other periodic signal caused by other motion within the radar area.

8. The detection device as claimed in claim 1, wherein the processing circuitry is configured to detect whether a living being is present within said radar area by measuring the distance to the predetermined locations within the radar area from the received radar radiation.

9. A radar system, comprising:
the detection device as in claimed 1; and
at least one radar unit, including the radar unit, configured to emit radar radiation to an assigned radar area included and to receive radar radiation from the radar area.

10. The radar system as claimed in claim 9, wherein the at least one radar unit includes at least two collocated antennas for emitting and receiving radar radiation or at least two sets of a transmitting antenna for emitting radar radiation and a receiving antenna for receiving radar radiation.

11. The radar system as claimed in claim 9, wherein the at least one radar unit is two or more radar units.

12. The radar system as claimed in claim 9, further comprising:
an imaging system configured to acquire one or more images of the radar area; and
image processing circuitry configured to process the acquired one or more images of the radar area to obtain the set of predetermined locations of the monitored area.

13. The radar system as claimed in claim 9, further comprising a user interface configured to issue user information indicating the predetermined location, number and/or direction of predetermined locations within the radar area that are occupied by a living being and/or that are not occupied by a living being and/or to issue user information guiding a user to a non-occupied predetermined location and/or an area of non-occupied predetermined locations.

14. The radar system as claimed in claim 9, further comprising an emergency interface configured to issue emergency information guiding emergency staff to a predetermined location at which a living being is detected.

15. A detection method, comprising:
evaluating radar radiation, received by a single radar unit in response to radar radiation emitted by the radar unit throughout a radar area, by using back-projection to determine whether a first living being is present within the radar area, determine whether a second living being is present within the radar area, and localize the first and second living beings within the radar area, the radar area including a set of predetermined locations;
correlating, by processing circuitry, locations of each of the first and second living beings in the radar area with the set of predetermined locations located in the radar area to detect whether the first living being is present at a first predetermined location of the set of predetermined locations and to detect whether the second living being is present at a second predetermined location of the set of predetermined locations; and
outputting a predetermined location, of the set of predetermined locations, in which a living being is not present based on the correlation of the locations of each of the first and second living beings with the set of predetermined locations.

16. A guidance device, comprising:
a receiver configured to receive location information from the detection device of claim 1, the location information indicating the predetermined location; and
circuitry configured to:
determine a way from a current location of a user to the predetermined location indicated by said location information; and
issue guidance information for guiding the user from the current location to the predetermined location.

17. A non-transitory computer-readable recording medium that stores therein a computer program product, which, when executed by a processor, causes the processor to perform the method of claim 15.

18. The detection device as claimed in claim 1, wherein the processing circuitry is further configured to:
determine a way from a current location of a user of the detection device to the predetermined location; and
output guidance information for guiding the user from the current location to the predetermined location.

19. The detection device as claimed in claim 1, further comprising a display, wherein
the processing circuitry is configured to control the display to output information indicating a number and/or direction of predetermined locations within the monitored area that are occupied by a living being and/or that are not occupied by a living being and/or to output information about the presence and location of detected living beings within said monitored area.

* * * * *